United States Patent [19]

Mas

[11] 4,076,609
[45] Feb. 28, 1978

[54] ELECTROLYSIS APPARATUS

[75] Inventor: Louis Mas, Buc, France

[73] Assignee: Societe de Recherches Techniques et Industrielles, Paris, France

[21] Appl. No.: 647,990

[22] Filed: Jan. 9, 1976

[30] Foreign Application Priority Data

Jan. 14, 1975 France .............................. 75 00993

[51] Int. Cl.² .......................... C25B 1/02; C25B 1/04; C25B 1/08
[52] U.S. Cl. ..................................... 204/258; 204/256; 204/255; 204/279
[58] Field of Search ............... 204/252, 253, 254, 255, 204/256, 263, 266, 267, 270, 278, 279, 258, 275

[56] References Cited

U.S. PATENT DOCUMENTS

| | | | |
|---|---|---|---|
| 1,771,091 | 7/1930 | Lawaczeck | 204/275 X |
| 2,717,872 | 9/1955 | Zdansky | 204/258 X |
| 3,421,996 | 1/1969 | Coval et al. | 204/255 |
| 3,429,799 | 2/1969 | McWhorter | 204/279 |
| 3,752,757 | 8/1973 | Stephenson et al. | 204/254 X |
| 3,836,448 | 9/1974 | Bouy et al. | 204/270 |
| 3,873,437 | 3/1975 | Pulver | 204/254 |
| 3,875,040 | 4/1975 | Weltin et al. | 204/254 X |

Primary Examiner—Arthur C. Prescott
Attorney, Agent, or Firm—Cushman, Darby & Cushman

[57] ABSTRACT

An electrolysis apparatus formed by a stack of cells which are held together by two end-plates connected by tie-rods, wherein a system comprising two kinds of elements provides, firstly, electrical insulation between pairs of adjoining rings and secondly a seal to prevent the electrolyte from escaping to the exterior. Such an apparatus further comprises a system of ducts formed by stacks of bushes which are assembled to form a piping, wherein said bushes are sealed to the diaphragm and bears against adjoining bushes via a joint which is contact with an electrode, the bushes forming the infeed ducts being perced with one or more small diameter passages, the bushes forming the outlet ducts being perced with passages which cause a much smaller pressure loss.

13 Claims, 15 Drawing Figures

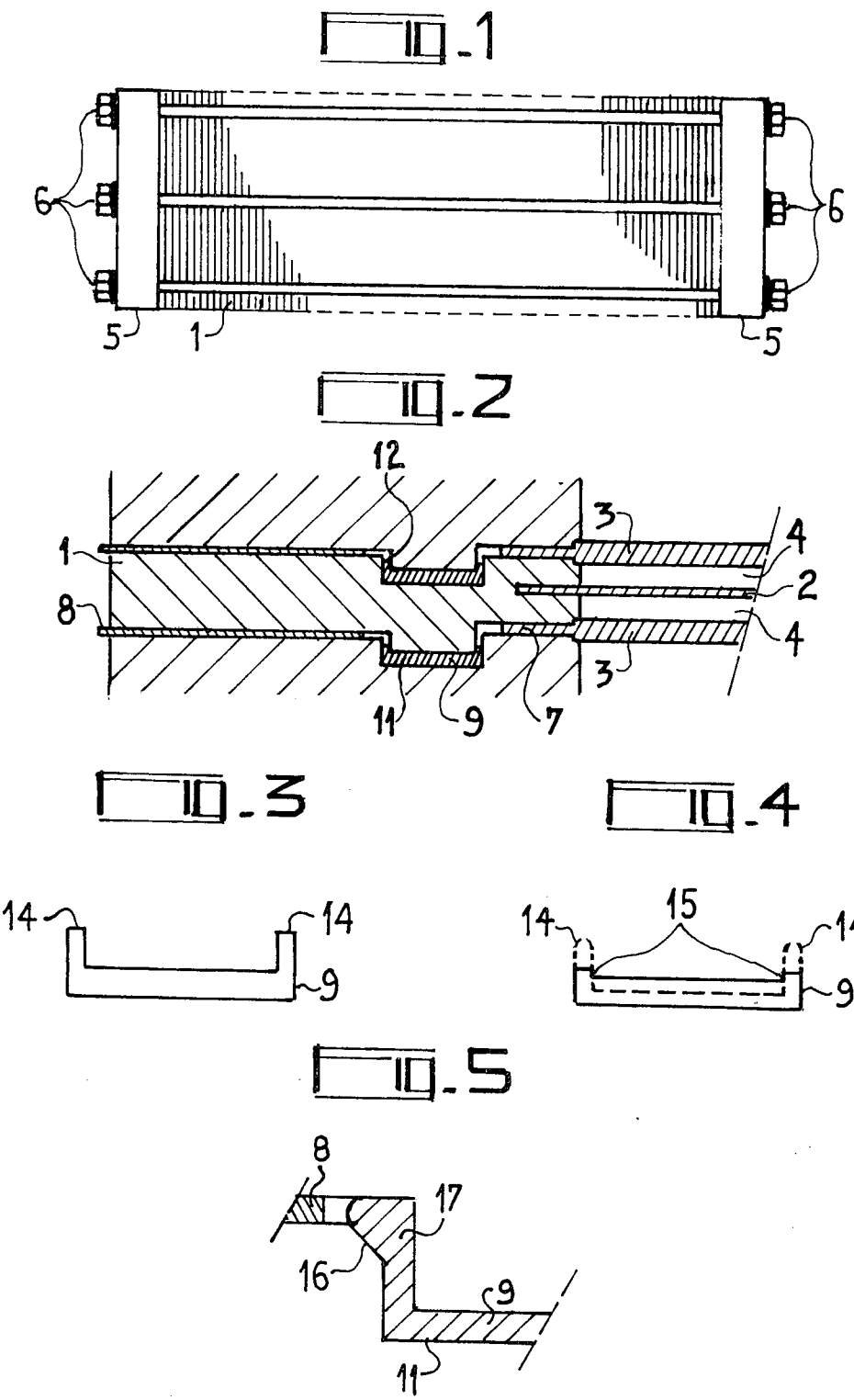

ELECTROLYSIS APPARATUS

The invention relates to electrolysis apparatus, that is to say apparatus intended for the electrolytic decomposition of a liquid, and in particular to apparatus of this kind which is capable of operating at pressures of several tens of bars and at temperatures of the order of 100° C and above.

Electrolysis apparatus is known, in particular that described in French Pat. No. 1,151,507 and in the 12 Swiss patents from which it claims priority. This apparatus is constructed from a stack of cells containing electrodes clamped into pressure-resistant rings. The space between two electrodes or cells is separated by a diaphragm into two compartments filled with electrolyte and into which oxygen and hydrogen respectively are released when it is water which is electrolysed. The rings are separated from one another by joints which perform two functions:

firstly they provide electrical insulation between pairs of adjoining rings, the voltage between any two consecutive electrodes being approximately 2 volts, and secondly, they provide a seal to prevent the electrolyte from escaping to the exterior.

The stack of cells is held clamped between two endplates by external tie-rods.

Electrolysis apparatus so constructed operates satisfactorily when temperature and pressure are both relatively low. However, when the temperature rises, sealing deficiencies become apparent. The rings, and in particular their joints, are at a higher temperature than the external tie-rods and expand more than the latter, which causes the joints between the rings to be compressed beyond their elastic limit. This happens even if the precaution has been taken of providing the tie-rods with resilient washers, it being difficult for the washers to make up for the difference in expansion between the rings and the tie-rods. The compression of the joints between the rings does not cause leaks when it occurs, but only when the apparatus is turned off and temperature returns to normal. When it is desired again to put such an electrolytic apparatus into operation, its operating pressure is reached well before its temperature has risen and at this time the joints, having previously been compressed, no longer perform their function and give rise to leaks. These leaks become more serious the higher the operating pressure. To start up such an electrolysis apparatus, it is therefore necessary to raise its temperature before pressurising it, i.e. before initiating the electrolysis. This results in a more complicated apparatus, given that it is necessary to have a special heating device which is independent of the electrolysis current, and in particular in a loss of time which may be as much as several hours.

An object of the invention is an electrolysis apparatus which can be started up quickly without a preheating period, but which nevertheless operates at relatively high temperatures and pressures. This was impossible with prior art apparatus due to the compression of the annular sealing joints which occured when the temperature rose.

In accordance with one of the main features of the invention, the rings are separated from one another by two kinds of elements, these being a first element which is formed from a thin and hard insulating material, and a second element forming joint which is situated radially inward from the first element and which may be thicker and which is formed from an elastic insulating material which is chemically inert with respect to the electrolyte.

Since the cells are stacked one against the other, they need to be served by ducts which bring in electrolyte and remove the mixture of gas bubbles and electrolyte (the catholyte or anolyte). These ducts are generally made up of short tubes of bushes stacked together. Each bush corresponds to one cell. The bushes are pierced with openings which allow them to communicate with the cell on alternate sides of the diaphragm, with the result that each compartment has passing through it four bushes, two of which communicate with it and the other two of which merely pass through it so as to open into neighbouring compartments. It is possible to reduce the number of ducts by using the same duct to feed electrolyte into all the cells.

When the cells are stacked, the bushes fit into one another and when the assembly is clamped-up they press against the diaphragms and the electrodes. It is essential that there be a perfect seal both between the diaphragms and the bushes and between the electrodes and the bushes in order to avoid any dangerous intermixture between the catholyte and anolyte.

To produce this seal, there can be no question of attaching each bush in a sealed fashion both to a diaphragm and an electrode before the cells are stacked, since a cell has to share one of these components with another cell. It is therefore necessary that the seal formed with one of the components be produced simply by pressure at the time when the cells are stacked.

It might be thought possible to mount the bushes in a sealed manner on the metal electrodes before stacking and to produce the seal between the bushes and the diaphragms by compressing the latter at the time of stacking.

This solution is unaceptable however, since the material which has to be used for the diaphragms is not asbestos board, which is difficult to handle, but is generally asbestos cloth, which is suitably easy to handle and use. However, unlike the board material, the cloth is not sufficiently elastic to produce a reliable seal simply by being compressed at the time of stacking.

Another object of the present invention is to overcome these drawbacks and relate to a structure wherein each bush is fitted in a sealed fashion to the diaphragm before the cells are stacked, the seal between the bushes and the electrodes being produced by pressure at the time of stacking as a result of an elastic joint being inserted between bush and electrode.

When the cells are operating, the electrolyte must circulate within them in such a way that there are no stagnant zones. In apparatus which operates at relatively low pressures, less than 5 bars for example, the volume of the bubbles is sufficient to ensure the circulation of the electrolyte by gravity towards the top of the cells. This does not apply in the case of the pressures reached in the electrolysis apparatus in which the bubbles of gas are held compressed and the difference in electrolyte density is more dependent on differences in temperature than on the presence of embryo forming. The electrolyte is fed in at the lower part of the cells and removed at the top so as to exploit the tendency of the electrolyte to rise, but this is not enough.

Still another object of the present invention is to provide a structure wherein the infeed orifices for the electrolyte are down wardly directed so that the electrolyte will circulate in the cells in homogeneous manner without stagnant zones, these orifices being preferably oriented towards the bottom of the cell within a cone whose apex angle is 90° and whose axis lies on the straight line joining the axis of the cell and the axis of the duct.

The invention more particularly relates to an electrolysis apparatus formed by a stack of cells containing electrodes each of which is held in a pressure-resistant ring, the space between pairs of electrodes being separated into two compartments by a diaphragm, the said compartments being filled with electrolyte which generates the two gases produced by electrolysis in alternate ones of the compartments, the compartments having passing through them at least three ducts, at least one of which is an infeed duct for the electrolyte and the two others are outlet ducts for a mixture of electrolyte and one or other of the gases, the ducts being in communication with respective compartments by means of passages which pass through the ducts, the assembly of stacked rings being held between two end-plates and compressed by tie-rods; said apparatus comprising a system separating each ring from adjoining rings, constituted by a first and a second element, said first element being formed from a hard insulating material which performs insulating and compression resisting functions; said second element being a joint formed from an elastic insulating material which is chemically inert with respect to the electrolyte, which perform insulating and sealing functions.

The invention will be better understood and the foregoing and other objects, features and advantages will be more clearly apparent from the following description, which is given solely by way of example, and which refers to the accompanying schematic drawings in which:

FIG. 1 is a general diagram of an electrolysis apparatus;

FIG. 2 is ring-edge according to the invention;

FIG. 3 is a ring sealing joint;

FIG. 4 is a modification of the previous sealing joint;

FIG. 5 is another modified joint;

Figure 6:
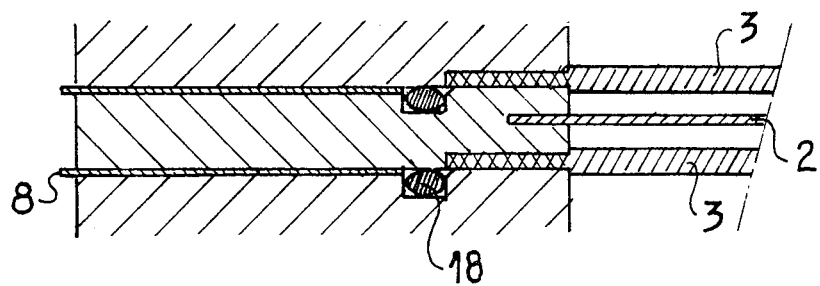
FIG. 6 is a ring-edge fitted with toroidal joint.

FIG. 1 is a schematic section through an assembled electrolysis apparatus with rings 1 stacked against one another and held clamped between two end-plates 5 by tie-rods 6.

In FIG. 2 can be seen one of the electrodes, which is shown schematically at 2, the electrodes being attached in a sealed fashion substantially half-way up the rings by a known process of which nothing need be said here. The diaphragms 3, which are made of asbestos cloth, are clamped between pairs of adjoining rings. Together, the components mentioned forms compartments 4 on either side of the electrodes and the diaphragms. Oxygen and hydrogen are evolved in alternate compartments in cases where it is water which is electrolysed.

The rings 1, which are pressed against one another, are separated by a first element 8. The sole function of which element 8 is to insulate the discs electrically against a voltage of approximately 2 volts. The first element is made from a hard and mechanically strong material. It plays no part in sealing the cells and is not necessarily chemically inert with respect to the electrolyte. By means of the end-plates, the tie-rods, and resilient washers, the complete assembly is clamped up in such a way that the rings 1 are always pressed against element 8 whatever the internal pressure and temperature.

The seal between a compartment 4 and the exterior of the rings 1 is produced by a second element 9 whch is a joint made from an electrically insulating material which is resistant to the chemical action of the electrolyte and the gases produced by electrolysis. Since the rings 1 are at all times pressed against one another through the first element 8, and since the latter is hard and only slightly compressible, the joint 9 is subject to an almost constant pressure and this pressure is independent of the operating temperature and pressure since the distance between the rings is practically unvarying.

Polytetrafluorethylene, which is only slightly resilient but flows easily, is used for the second element or joint 9. Its lack of resilience has no adverse effect on the seal which it forms since its thickness is practically constant.

FIG. 3 shows one possible shape for joint 9. Such a joint 9 is located in a groove 11 to which corresponds a ridge 12 on the adjoining ring to prevent its being forced outwards. It will be seen that on either side of the base 13 of the joint, there need to be two lips 14 which are intended to be positioned between the walls of the groove 11 and the sides of the ridge 12 to prevent any electrical contact between these two areas. When the stack is clamped up, the material of joint 9 flows and lips 14 extend. When the rings 1 are pressing against both sides of first element 8 the clamping process is complete.

It is very expensive to produce such a joint whether it be by moulding or machining. It is for this reason that an originally flat joint may be used, the extensions 14 on which are formed by flow when clamping up takes place, but this makes it necessary for the various rings all to be exactly centralised in order to prevent any contact between the walls of grooves 11 and the sides of ridges 12.

FIG. 4 shows another solution which consists in providing joint 9 with flow-initiating portions as indicated at 15 which are used to centralise the rings relative to one another. Upon clamping, the material of the joint flows in the way indicated by the broken lines, and gives rise to two projections 14 which prevent any electrical contact between groove 11 and ridge 12.

FIG. 5 shows a useful improvement which consists in providing, on one wall 12 of groove 11 a bevel 16 which allows the outflowing material which was originally contained in the thickness of the joint to be accommodated in the form of a bead 17. A bevel may be provided on both of the walls 12. This allows the joint to be manufactured with wider tolerances and thus at lower cost.

FIG. 6 shows a modified joint where the seal is produced by a toroidal joint 18 inset in groove 11. This joint should be electrically insulating and should also be resistant to electrolyte and the products of its decomposition at the operating temperature and pressure. It has been found that the joint may be made from a copolymer of polytrifluorochloethylene and vinylidene fluoride.

Figure 7:
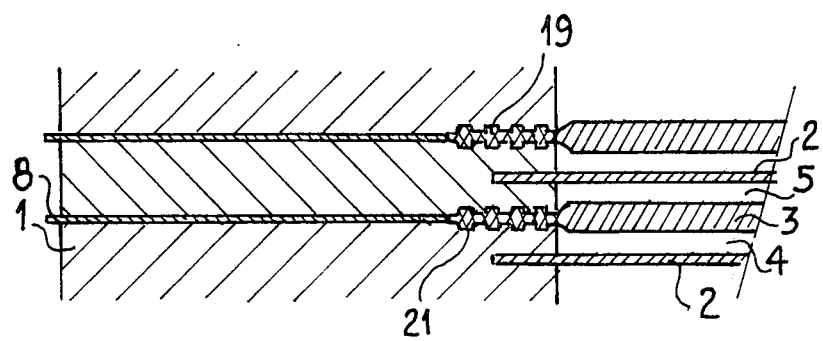
FIG. 7 is a ring-edge with modified sealing joint.

FIG. 7 shows another modified joint. The periphery 19 of the asbestos diaphragm 3 is impregnated throughout with polytetrafluorethylene and performs the function which in the other modifications is formed by the sealing joints. Circular grooves 21 hold the diaphragm in place at one periphery of the rings.

FIG. 7 shows a further modification. The first element 8 whose sole function is to provide electrical insulation between pairs of rings is replaced by depositing, on one face of each ring, an electrically insulating material which is sufficiently hard not to flow at the pressures involved. A layer of polypropylene or polytrifluorochlorethylene a few tenths of a millimeter thick may be deposited in this way.

Figure 8:
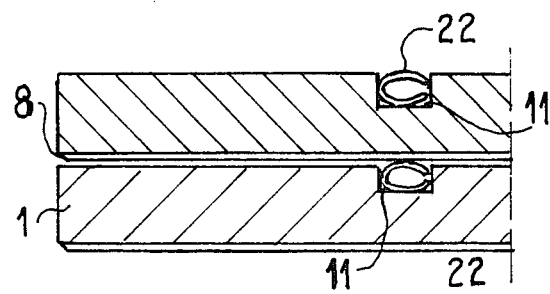
FIG. 8 is a ring-edge fitted with metal joint.

Finally, FIG. 8 shows another modification. The seal may be produced by a toroidal metal joint 22 which is located in a groove 11. This toroidal joint is formed by a strip of metal which is rolled into the shape of a tube, the opening at the side of the tube being directed towards the interior of the cell so that, under pressure, the tube will tend to open. In contrast to the modification shown in FIG. 6, in the present case the toroidal joint, which is conductive, bears against the hard insulating layer 8.

Figure 9:
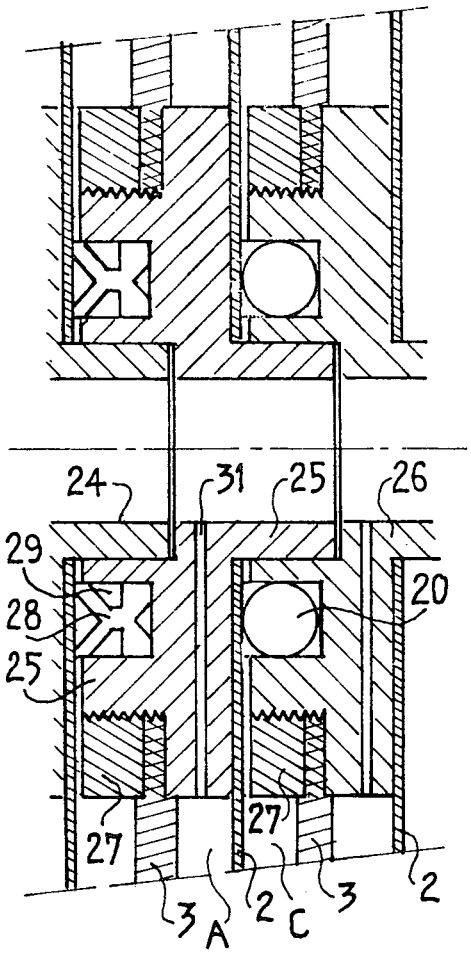
FIG. 9 is the way in which the ducting bushes fit together.

FIG. 9 shows how the bushes 24, 25 and 26 making up a piping. Bush 25 is attached in a sealed fashion to the asbestos cloth diaphragm 3 by a nut 27. The seal between the bush and the metal electrode 2 is produced by an elastic joint 28. This joint is fitted before assembly into a groove 29 which is provided in that face of bush 25 which is in contact with the electrode 2. Bush 25 is pierced by one or more radial passages 31 which allow it to communicate with an anode or cathode compartment (marked A and C on the drawing). In the present instance the bushes contain the anolyte. It can be seen that with this system of interengagement, the seal with the diaphragms is produced by nuts and that with the electrodes by elastic joints, the joints being tightened upon assembly by the external tie-rods which hold the rings pressed firmly against one another. It will be noted that the seal is formed not between the bushes themselves but, via their joints, with the electrodes and diaphragms. Any leaks which might occur between the bushes and the opposite faces of the electrodes from the joints are of no consequence since they will in any case be in parallel with passages 31. FIG. 8 shows a duct for anolyte. A duct for catholyte would be symmetrical.

Figure 10:
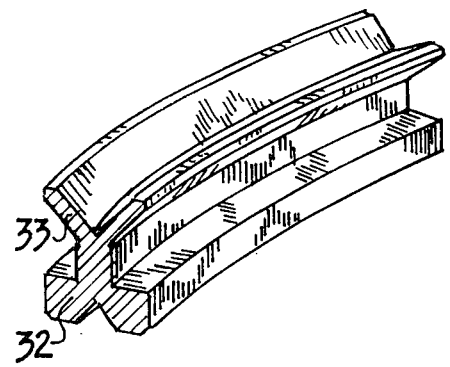
FIG. 10 is a design of joint to form a seal between bushes and electrodes.

FIG. 10 shows a form of joint which is suitable to produce a seal between bushes and electrodes. The bushes are made from an insulating material whose coefficient of expansion is very much higher (of the order of ten times higher) than that of the metal. This being the case, as heat builds up the bushes would be compressed beyond their elastic limit and when the electrolysis apparatus was put into operation there would be leaks between the bushes and the electrodes. To prevent this, the joints are of a special shape which endows them with high elasticity despite the low elasticity of the material which is normally used for them (PTFE). In FIG. 10 can be seen the cross-sectional shape of a joint, which is in the form of an X whose upper limbs 33 are thinner. The lower limbs 32 are held in the grooves 29 in the bushes, while the thinner upper limbs 33 have the requisite elasticity to produce a seal. Polytetrafluorethylene (PTFE) has been used for these X joints but it has been found that, when using a copolymer of polytrifluorochlorethylene (PTFCE) and vinylidene fluoride, satisfactory elasticity and thus the requisite seal could be obtained by replacing the X joint by a toroidal joint. This is shown at 20 in FIG. 9.

Figure 11:
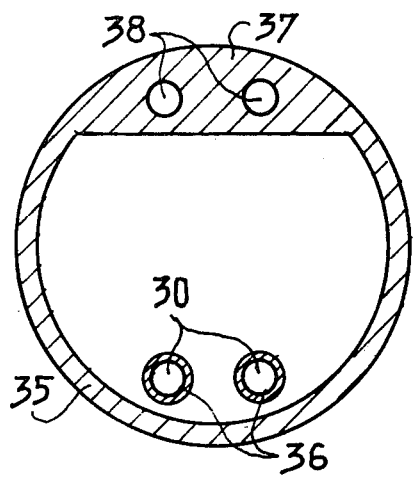
FIG. 11 is an electrode showing the position of the flow ducts for the electrolyte.

As shown in FIG. 11, to allow a seal to be produced with the asbestos cloth diaphragms, the cloth is impregnated with a suitable plastics material having the required characteristics in respect of plasticity, electrical insulation and inertness to chemicals. What are involved are the periphery 35, which is intended to be clamped between the rings, the peripheries 36 of the holes which are provided to allow passage of the return duct for the anolyte and catholyte, and the upper part 37 of the diaphragm in which can be seen the holes 38 for the upper ducts.

Figure 12:
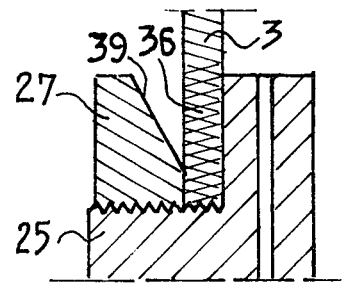
FIG. 12 is half a bush showing how it is attached to a diaphragm.

In FIG. 12 can be seen the way in which the periphery 36 or 37 of a hole in the diaphragm is clamped against a bush 25 by a nut 27. It will be noted that the bevelled part 39 of the bearing face of the nut 27 allows a more effective clamping action to be achieved.

In electrolysis apparatus which operates at high pressure and high temperature, it is essential that the throughput of electrolyte is nearly the same in all compartments and that the circulation of electrolyte is homogeneous throughout each of the compartments. The phenomenon of the upward movement of the electrolyte which is caused by the bubbles of gas produced by electrolysis (gas lift) is no longer perceptible when the operating pressure reaches approximately 10 bars, the bubbles being held in compression at this point and being too small to create a sufficiently great difference of density to cause the electrolyte to move upwards. It is therefore necessary to set up a suitable circulation by pumping. This circulation is necessary not only to remove the bubbles of gas but also, and in particular, to cool the apparatus. To ensure uniform distribution of the electrolyte in each compartment it is necessary that the pressure loss caused by the radial passages 31 from the ducts 30 for admitting the electrolyte at the bottoms of the compartments should be high in comparison with the overall pressure loss occurring along the length of ducts 30 (approximately 5 times higher). On the other hand the pressure loss should be low in the case of the radial passages 31 in the upper ducts 38 for removing the electrolyte. In one embodiment of the electrolysis apparatus a single passage of 1 millimeter diameter was used for the lower ducts 30 and three radial passages of 2.5 millimeters diameter for the upper ducts 38.

Numerous experiments have been carried out to determine the way in which the electrolyte circulates inside the compartments as dictated by the orientation of passages 31.

Figure 13:
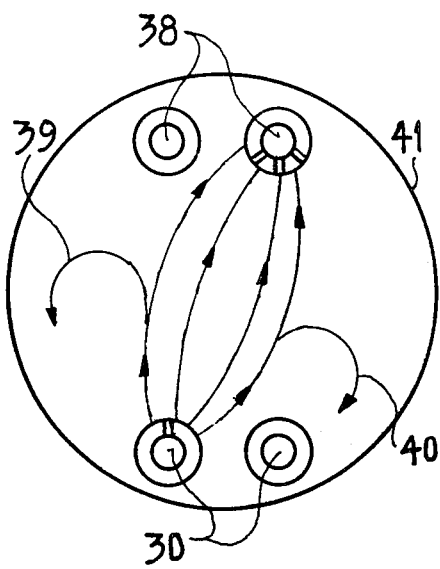
FIG. 13 is a compartment with openings arranged as in the prior art, showing the paths along which the electrolyte circulates.

In FIG. 13 can be seen arrows indicating the main directions taken by the electrolyte when the passages 31 in ducts 30 are directed upwards. Although the direct circulation indicated by arrows 41 is satisfactory, arrows 40 on the other hand indicate eddies which create more of less stagnant zones.

Figure 14:
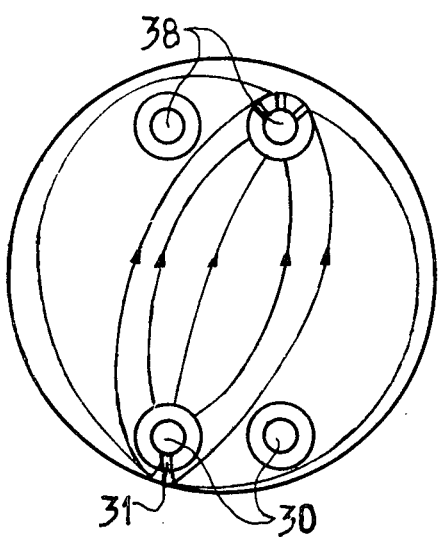
FIG. 14 is a compartment with openings according to the invention showing similar paths.

By contrast, it can be seen from FIG. 14 that the circulation pattern is very homogeneous when the passages 31 in the lower ducts 30 are directed downwards.

Figure 15:
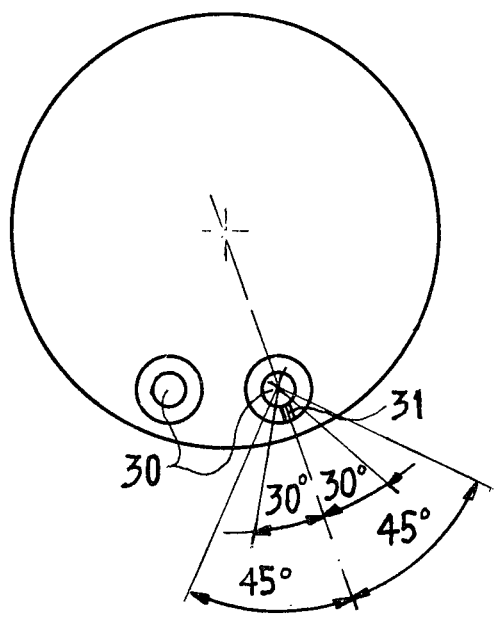
FIG. 15 is a compartment with openings oriented in accordance with the invention.

As shown in FIG. 15 it was found that the pattern of circulation had this characteristic when passages 31 were orientated anywhere within an angle of 30° on either side of the straight line which joins the lower duct 30 to the centre of the compartment. An almost satisfactory pattern was still obtained at an angle of 45° on either side of the straight line.

The orientation of the passages 31 in the upper ducts 38, on the other hand, has virtually no effect on the homogeneity of the pattern, but if the passages are orientated towards the upper part of the compartment this reduces the size of the bubble of gas which always exists at the top of each compartment.

The improvements just described make it possible to produce an electrolysis apparatus which has many advantages. The apparatus is more easily able to withstand higher operating pressures and temperatures and this leads to a considerable increase in its output relative to its size. This is due in large measure to the fact that the system located between the rings being able to resist the compression from the tie-rods, to provide electrical insulating function and sealing function is constituted by two different elements, a first element which performs the insulating and compression resisting function and a second element forming joint which is situated radially towards the interior of the ring with respect to the first element and which performs the insulating and sealing functions. Such a embodiment makes it possible to increase the durability of the joints. However, what is more important, despite the demanding conditions under which it operates, such an apparatus does not leak when it has cooled down after being turned off, and this allows it to be started up again quickly without fear of leakage even if the normal operating pressure is reached while the temperature is still low.

Below are given two examples of embodiments which bring out these advantages:

EXAMPLE 1

| | |
|---|---|
| Outside diameter of the rings | 610 mm |
| Inside diameter of the rings | 450 mm |
| Thickness of the rings | 13 mm |
| Width of groove 11 | 17 mm |
| Depth of groove 11 | 3.5 mm |
| Width of ridge 12 | 15 mm |
| Height of ridge 12 | 3.2 mm |

The first element 8 is made of 0.4 mm thick polypropylene and the second element or joint 9 is made of pure, 0.9 mm thick PTFE.

The cell assembly is clamped up with a total force of 245 tons.

By virtue of its constructional characteristics, the apparatus will tolerate being started up at full power at ordinary temperature without leaking. Pressure takes less than 10 minutes to rise to 90 bars whilst temperature takes approximately 1 hour to rise to 80°.

The apparatus has been subjected to 1350 pressure cycles from 1 to 70 bars and 100 temperature cycles from 20° to 80° without the slightest leak appearing and without it being necessary to tighten the nuts at the ends of the tie-rods.

EXAMPLE 2

The bushes 24, 25 and 26 forming ducts 30 and 38 have an outside diameter of 56 mm and inside diameter of 12 mm and are 20 mm long. The annular joint 28 has an inside diameter of 22 mm and an outside diameter of 34 mm. The clearance between bushes and electrodes 2 is 0.15 mm.

An electrolysis apparatus provided with such an arrangement has operated at 30 bars with a current density of 0.2 amps per square centimeter at 80°.

It was found that the oxygen contained 0.2 per cent hydrogen and that the hydrogen contained a proportion of oxygen only slightly above the smallest which could be measured by the measuring device.

These figures demonstrate that the internal sealing in the apparatus, which is obtained by virtue of its constructional characteristics was excellent and in particular that there was no leakage between the anolyte ducts and the catholyte compartments or vice versa.

What is claimed is:

1. An electrolysis apparatus formed by a stack of cells containing electrodes each of which is held in a pressure-resistant annular ring, the space between pairs of electrodes within said ring being separated into two compartments by a diaphragm, the said compartments being filled with electrolyte which generates the two gases produced by electrolysis in alternate ones of the compartments, the compartments having passing through them at least three ducts, at least one of which is an infeed duct for the electroyte and the two others are outlet ducts for a mixture of electrolyte and one or other of the gases, the ducts being in communication with respective compartments by means of passages which pass through the ducts, the assembly of stacked rings being held between two end-plates and compressed by tie-rods; said apparatus comprising a first compression resisting and electrical isolating element cooperating with a second elastic sealing element to form a system separating each ring from adjoining rings, said first element being formed as a first annular ring and from a hard electrical insulating material for electrically insulating adjacent cells from each other and resisting compression forces and said second element being formed as a second annular ring with said first ring from an elastic insulating material which is chemically inert with respect to the electrolyte for sealing said compartments.

2. An electrolysis apparatus according to claim 1, wherein said second element is made of a material which flows easily and is inserted in a circular groove made in the periphery of a ring, the said material being compressed by a ridge which is complementary to the said groove and is formed on the periphery of the adjoining ring.

3. An electrolysis apparatus according to claim 2, wherein the second element is formed by a ring of flowing material which is inserted in a circular groove, said ring, before insertion having flow-initiating portions which centralises the rings relative to one another.

4. An electrolysis apparatus according to claim 2, wherein at least on one wall of the groove a bevel is provided, allowing the use of a joint manufactured with wider tolerances.

5. An electrolysis apparatus according to claim 1, wherein said second element is formed by a toroidal joint.

6. An electrolysis apparatus according to claim 5, wherein said toroidal joint is made from a copolymer of polytrifluorochlorethylene and vinylidene fluoride.

7. An electrolysis apparatus according to claim 1, wherein said second element is formed by a section of the diaphragm which has been impregnated throughout beforehand with polytetrafluorethylene, securing the sealing function.

8. An electrolysis apparatus according to claim 1, wherein said first element is formed by depositing a low-flow insulating material on at least one face of the ring, said material being sufficiently hard not to flow at the pressure involved.

9. An electrolysis apparatus according to claim 1, wherein said first element extends for the whole width of the ring and in that the second element is formed by a toroidal metal joint.

10. An electrolysis apparatus as in claim 1, wherein said passage between said infeed duct and each of said compartments is directed outwardly toward said rings.

11. An electrolysis apparatus as in claim 10, including first and second infeed ducts situated in the lower part of said space, said passages between said infeed ducts and said compartments being downwardly directed within a cone whose apex angle is 90° and whose axis joins the duct with the ring center.

12. An electrolysis apparatus as in claim 11, wherein the cone has an apex angle of 60°.

13. An electrolysis apparatus as in claim 11, wherein the outlet ducts are situated in the top part of said space and the passages between said outlet ducts and said compartments are directed toward the tops of the rings.